Patented Nov. 11, 1952

2,617,746

UNITED STATES PATENT OFFICE 2,617,746

METHOD OF INHIBITING CARBONATE BLOOM

Robert E. Parry, Martinsville, N. J., assignor to Johns-Manville Corporation, New York, N. Y., a corporation of New York No Drawing. Application December 19, 1949, Serial No. 133,949

3 Claims. (Cl. 117—126)

This invention is concerned with carbonate bloom, and is particularly directed to the problem of inhibiting carbonate bloom discoloration of a surface of a sheet or board product of hydrated alkaline silicate composition.

One of the most troublesome problems encountered in the building products industry is the discoloration of air exposed surfaces of sheet and board products embodying a hydrated alkaline silicate by the formation of a white efflorescence or bloom. In some cases the appearance of such substances is marred by formation of a uniform bloom deposit, and at other times by an irregular bloom causing a blotchy or mottled appearance.

The bloom is apparently caused by the movement of uncombined lime and water-soluble salts present in such products as asbestos-cement shingles to the surface by water during the curing and drying treatment. The thus surface concentrated soluble salts and lime react with carbon dioxide present in the atmosphere to form a carbonate bloom, which usually consists chiefly of calcium carbonate. The calcium carbonate bloom is not particularly noticeable or objectionable on white surfaces, but it causes troublesome discoloration of the surfaces of gray base products or products having dark colored pigment-veneered surfaces, due to the color contrast between the white bloom and the darker base.

Acid washing has been used to clear up discoloring deposits of carbonate bloom previously formed during normal air cure, and has also been suggested for preventing or retarding formation of bloom. However, acid washing is not effective for permanently inhibiting bloom formation, and is otherwise undesirable because of affecting adversely the strength of the calcium silicate bond and the color of pigments present at the surface of the shingles. Other proposed surface treatments with waxes and oils in emulsified or solvent reduced form in concentrations adapted to impart water-repellency, have been found to seriously interfere with the development of a strong cure of the hydrous silicate base material.

The problem of calcium carbonate bloom discoloration is particularly serious in the case of asbestos-cement shingles or sheet products in which the major bonding ingredient is a hydrated calcium silicate, when a hardening cure of such products is accelerated by autoclaving in a pressure steam atmosphere. The steam curing operation accelerates such surface concentration of free lime and develops objectionable carbonate bloom discoloration at the surfaces of such hydrous calcium silicate bonded products. The bloom deposit which develops after autoclaving is much more adherent than bloom formed by normal air cure, and is very difficult to remove by conventional methods.

A primary object of the present invention is to effectively treat products of alkaline silicate composition to inhibit bloom discoloration thereof.

A particular object is to provide a method for treating green uncured asbestos-cement shingles and boards to inhibit formation of carbonate bloom at a surface thereof during hydration hardening and drying treatment.

With these objects in view, the invention consists in the method of inhibiting formation of carbonate bloom on a surface of an asbestos-cement shingle or other product having a hydrated alkaline silicate matrix.

In the following description the invention will be described with reference to its specific application to the suppression or inhibiting of white calcium carbonate bloom discoloration of a surface of an asbestos-cement shingle.

The present method provides total and permanent suppression or inhibiting of carbonate bloom at one face of an asbestos-cement shingle, even when the shingle cure is accelerated by autoclaving in a pressure steam atmosphere. Essentially the method consists in applying, as by mopping, or spraying, a thin continuous coating of a very dilute aqueous emulsion of high melting point heat stable wax to that surface of the shingle which it is desired to protect against bloom formation and discoloration, while the shingle is in a self-supporting but green uncured state. A suitable emulsion is one containing between 0.3% and 0.6% high melting paraffin wax solids based on the total weight of emulsion employed. The wax coating treatment should deposit high melting wax solids within the pores adjacent the treated surface in the amount of .003–.010 lb./sq. ft., and preferably between .003 and .006 lb./sq. ft. of shingle or board thus treated. After thus applying the thin coating of emulsified wax, the coated green shingle is submitted to successive air and pressure steam curing and drying treatment. This wax coating treatment is completely effective for suppressing or inhibiting bloom at the treated surface of any steam cured shingle having a binder matrix of hydrated calcium silicate developed during hydration hardening cure.

Experience has shown that when the amount of wax introduced to the pores of the shingle exceeds about .010 lb./sq. ft. of shingle surface, it has an adverse effect on the hardening cure of the shingle. Satisfactory results were obtained when employing an aqueous emulsion of 0.5% wax solids, the wax comprising paraffin of 140–150° F. melting point, to form a film depositing approximately .005 lb. of wax per sq. ft. of treated surface.

While the thin wax film coating of one surface of an asbestos-cement shingle, followed by accelerated steam cure, is effective for inhibiting formation of carbonate bloom at such surface during and after the steam curing and drying treatment, such treatment does not prevent formation of bloom at the opposite untreated face of the shingle. This would suggest that the light deposit of wax which is applied in and around the pores at the treated surface of the shingle serves to inhibit movement of water from the interior of the shingle toward such surface during the steam curing and drying treatment, with the result that movement of water carrying dissolved salts takes place chiefly toward the untreated surface.

It will be understood that the details given are for the purpose of illustration, not restriction, and that variations within the spirit of the invention are intended to be included in the scope of the appended claims.

What I claim is:

1. A method of inhibiting bloom discoloration of a surface of an article having an in situ developed hydrous calcium silicate bond which comprises, applying to said surface, prior to hardening cure development of the bond, a thin film consisting essentially of a dilute water emulsion of heat resistant high melting point paraffin wax containing wax solids in amount sufficient to deposit .003–.010 lb./sq. ft. of face surface, and subjecting the thus coated uncured article to an accelerated hardening cure in a pressure steam atmosphere.

2. A method of inhibiting bloom discoloration of asbestos-cement sheets which comprises, uniformly distributing over one surface of a green uncured sheet a thin film consisting essentially of a highly dilute water emulsion of paraffin wax containing approximately 0.6% wax solids, said wax having a minimum melting point of about 140° F., and said film containing wax solids in amount sufficient to deposit .003–.010 lb./sq. ft. of surface, and subjecting the thus coated sheet to an accelerated hardening cure by autoclaving in a pressure steam atmosphere.

3. A method of inhibiting bloom discoloration of the exposed face of an asbestos-cement shingle which comprises, applying to said face of the green uncured shingle a thin film coating consisting essentially of water emulsified high melting point paraffin wax containing wax solids in amount sufficient to deposit .003–.006 lb./sq. ft. of face surface, and submitting the thus coated shingle to accelerated cure in a pressure steam atmosphere.

ROBERT E. PARRY.

REFERENCES CITED

The following references are of record in the file of this patent:

UNITED STATES PATENTS

| Number | Name | Date |
|---|---|---|
| 1,867,421 | Rowan et al. | July 12, 1932 |
| 2,044,786 | Harshberger | June 23, 1936 |
| 2,275,272 | Scripture | Mar. 3, 1942 |